Dec. 13, 1966 L. F. CRAEMER ETAL 3,291,649

THERMOELECTRIC CONTROL DEVICE

Filed April 9, 1962

INVENTORS.
LAMBERT F. CRAEMER
DOUGLAS R. SCOTT

BY *Mead, Browne, Schuyler, & Beveridge*

ATTORNEYS.

3,291,649
THERMOELECTRIC CONTROL DEVICE

Lambert F. Craemer and Douglas R. Scott, both of Santa Ana, Calif., assignors to Robertshaw Controls Company, a corporation of Delaware Filed Apr. 9, 1962, Ser. No. 186,043
15 Claims. (Cl. 136—217)

This invention relates to thermoelectric control devices for use in heating system controls and the like.

In controls for heating systems, it is conventional to utilize thermocouples for energizing electromagnetic valves which control fuel flow to a burner. A pilot burner is positioned to apply heat to the "hot junction" of the thermocouple to energize the electromagnetic valve and maintain fuel flow to the burner. When the pilot flame is extinguished, the thermoelectric junction of the thermocouple cools to de-energize the valve and shut off the fuel flow.

Since the thermoelectric junction of a thermocouple is formed by two conductors of dissimilar metals, it follows that the conductors will have different coefficients of thermal expansion, which due to temperature changes encountered, will create significant mechanical stresses at the junction. Such stresses not only limit the efficiency of the thermocouple but also create conditions tending to break down the components of the thermoelectric generator. For example, due to the stresses created by the different rates of expansion and contraction of the conductors, the junction is highly susceptible to what is commonly referred to as "stress corrosion."

It is an object of this invention to provide a thermocouple construction for compensating for the differences in expansion or contraction of the thermocouple elements.

A further object is to provide a thermoelectric control device in which one element constitutes both a pilot burner head and one element of a thermocouple.

Still another object is to provide a thermocouple and pilot burner which can be mounted as a unit with the thermocouple and pilot burner maintained always in the proper relationship.

The objects are attained by the provision of a sheath or casing of thin conductive material having substantially parallel opposed walls. Positioned in the casing is a rod of dissimilar material from the casing which is joined to the inner walls of the casing to form a thermoelectric junction with the casing. Expansion and contraction of the elements due to temperature changes are compensated for by lateral flexing of the casing wall which virtually eliminates mechanical stresses at the junction of the casing and rod.

In other embodiments, a pilot burner head is integrally formed in the sheathing adjacent the thermoelectric junction in such a position to heat the junction not only by direct contact of the pilot flame but also by conduction of heat through the casing wall.

These and other objects will become apparent from the following description taken in connection with the accompanying drawings in which.

Figure 1:
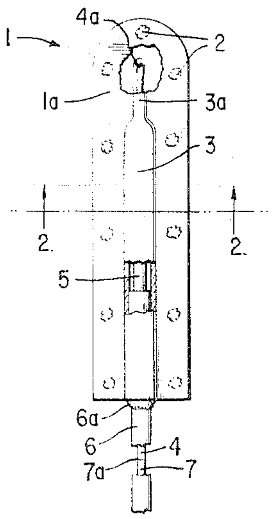
FIG. 1 is an elevational view, partially in section, of a thermocouple embodying one form of the invention.
Figure 2:
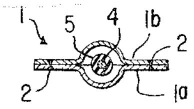
FIG. 2 is a sectional view taken on line 2—2 of FIG. 1.

Referring to FIGS. 1 and 2, a thermocouple comprises an outer element in the form of a sheath or casing 1. Casing 1 is formed by a pair of complementary shaped sheet metal stampings 1*a* and 1*b*, which are joined in opposed relationship along their peripheral edges by spot welds 2 or any other conventional means. Members 1*a* and 1*b* are preferably of stainless steel but may be of any conductive material. Elongated depressions in members 1*a* and 1*b* cooperate to define a cavity or recess 3 having a portion 3*a* of reduced diameter at its end. Sheet members 1*a* and 1*b* cooperate to provide casing 1 with a pair of opposed substantially parallel walls.

Positioned in recess 3 is an inner thermocouple element in the form of a Chromel rod 4 having its upper end received in the reduced end portion 3*a* of recess 3 and welded or soldered at 4*a* to members 1*a* and 1*b*. While a Chromel rod is preferred, rod 4 may be of any conductive material dissimilar to the material of casing 1 to form a thermoelectric junction at 4*a*. As is well understood in the thermocouple art, application of heat to junction 4*a* will generate an electric current which may be utilized to actuate an electromagnetic control element or the like.

Rod 4 is encased in an insulating sleeve 5 to electrically insulate it from the walls of the enlarged portion of recess 3, and the outer conductor 6 of a coaxial lead assembly. Conductor 6 is preferably in the form of copper tubing and is connected by welding or soldering 6*a* to sheath 1. Rod 4 is soldered to the inner conductor 7 at 7*a* to form the cold junction of the thermocouple.

Conductor 6 may be connected, for example, in circuit with one side of the winding of an electromagnetic valve (not shown) for controlling fuel flow to a pilot burner or the like, while conductor 7 is connected to the other side of the winding to complete the circuit. When heat is applied to the "hot junction" 4*a*, electric current is generated and energizes the control device to maintain it in operating position, and upon cooling of junction 4*a* the current flow stops to de-energize the device. With casing 1 and rod 4 of dissimilar materials, application of heat to junction 4*a* will cause the material of casing 1 and rod 4 to expand at different rates. Since casing 1 is of relatively thin sheet material, thermal expansion of casing 1 will tend to cause the opposed walls to "oil can" or flex laterally with respect to the longitudinal axis of rod 4 which will substantially eliminate mechanical stresses between rod 4 and casing members 1*a* and 1*b*.

Figure 3:
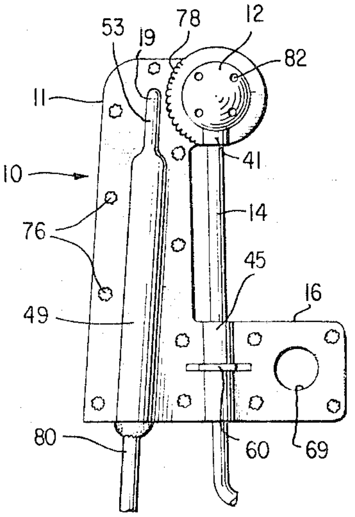
FIG. 3 is a view in elevation of a combined thermocouple and pilot burner embodying the invention.
Figure 4:
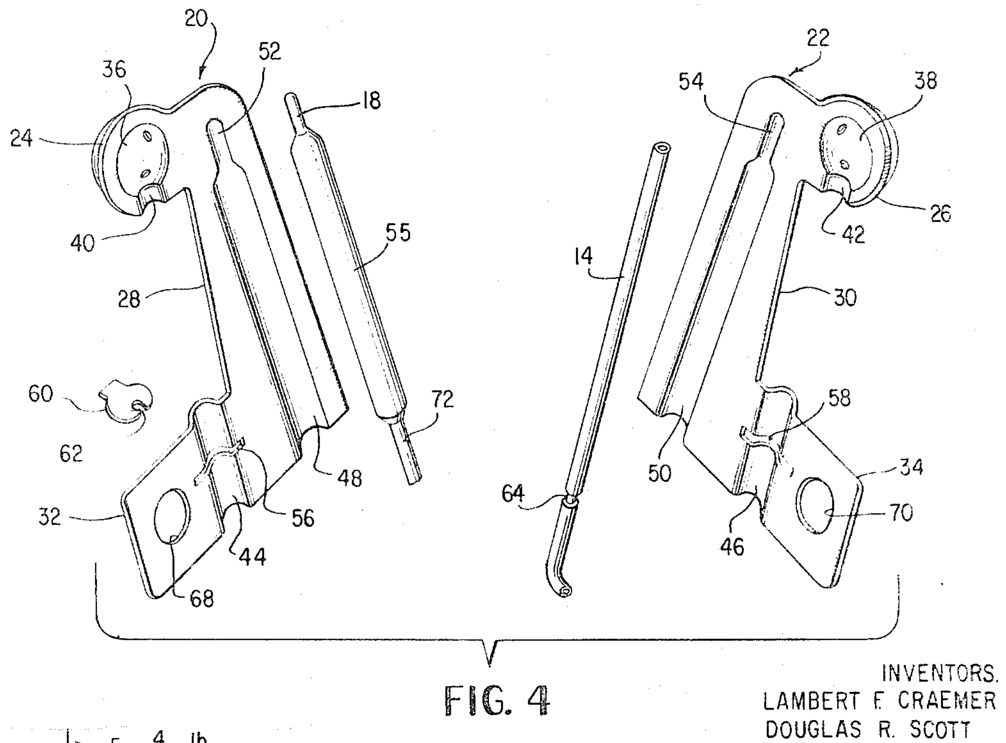
FIG. 4 is an exploded perspective view of FIG. 3.

FIGS. 3 and 4 illustrate a second embodiment in the form of a thermoelectric control unit 10 comprising a body portion 11 having a pilot burner head 12 and bracket portion 16 integrally formed at its upper and lower ends, respectively. Mounted on bracket portion 16 and communicating with the interior of pilot burner head 12 is a tubular conduit 14 for conducting fuel to the pilot burner. Body portion 11 receives a Chromel rod 18 (FIG. 4), the end of which is joined to casing 10 to form a thermoelectric junction at 19.

Control unit 10 is formed by a pair of complementary-shaped sheet metal stampings 20 and 22, that is member 20 is the mirror image of member 22. Members 20 and 22 are preferably of stainless steel. Member 20 comprises a pilot burner portion 24, body portion 28, and a bracket portion 32 which are complementary to portions 26, 30 and 34, respectively, of member 22. Hemispherical depressions 36 and 38 are formed respectively in members 20 and 22 and co-operate to form pilot burner head 12.

Intersecting hemispherical depression 36 is a depression 40 which co-operates with a similarly formed depression 42 in member 22 to form a cylindrical opening 41 which receives the end of tube 14. Tube 14 is also received in a substantially cylindrical recess 45 formed by co-operating depressions 44 and 46 in members 20 and 22, respectively. Opening 41 and recess 45 are in axial alignment with each other.

Rod 18 is received in a cylindrical recess 49 formed by co-operating depressions 48 and 50 in the sheet metal stampings, reduced portions 52 and 54 of depressions 48 and 50, respectively, forming the end 53 of reduced diameter. As pointed out above, the upper end of rod 18 is received in reduced portion 53 and soldered or welded to stampings 20 and 22 to form the hot junction 19. Rod 18 is encased by an insulating sleeve 55 in a manner similar to the construction of FIGS. 1 and 2.

Slots 56 and 58 are provided in depressions 44 and 46 for receiving a retaining member 60. Retaining member 60 is formed with a notch 62 which co-operates with a groove 64 in gas tube 14 to retain the gas tube in position on bracket portion 16. Openings 68 and 70 and portions 32 and 34, respectively, co-operate to provide a mounting hole 69 for receiving a bolt or other conventional fastener for mounting control device 10 on supporting structure.

Sheet metal members 20 and 22 are joined together by spot welds 76 in a manner similar to the embodiment of FIGS. 1 and 2. In order to prevent the fuel from pilot burner head 12 from coming into contact with element 18 and thermoelectric junction 19, members 20 and 22 are seam welded as indicated at 78 about the inner periphery of pilot burner 12.

Fuel is conducted through tube 14 to pilot burner 12 and is burned at a plurality of openings 82 formed in the pilot burner. Junction 19 is thus heated not only by direct contact with the flame but also by conduction of heat through the stainless steel. Conduit 14 preferably fits loosely within recess 41 rather than being soldered or force fitted in order to diminish the heat conductivity along the gas tube away from the thermoelectric junction.

Casing 10 and element 18 are connected with a coaxial lead assembly as indicated at 80 in a manner similar to the construction of FIGS. 1 and 2. Thermoelectric control device 10 may be mounted on a suitable support by bracket 16 and connected in a circuit with an electromagnetic control device so that fuel burning at pilot burner 12 will generate an electric current at the hot junction 19 to actuate the electromagnetic control device. Expansion and contraction of the thermocouple element is compensated for by the lateral flexing or "oil canning" of the casing 10.

Figure 5:
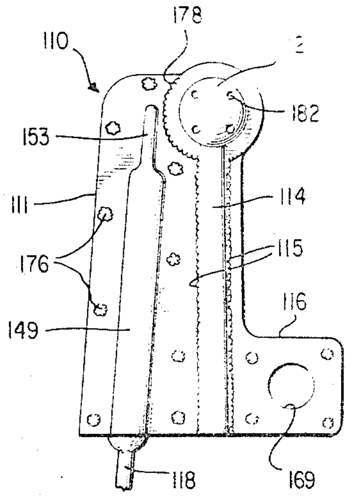
FIG. 5 is an elevational view of a modified form of the device illustrated in FIG. 3.

FIG. 5 illustrates a modified construction of the embodiment of FIGS. 3 and 4 in which a fuel passage is integrally formed in the casing or outer thermocouple element. Casing 110 is formed from a pair of complementary sheet metal stampings joined together by spot welds 176, having a body portion 111, a pilot burner portion 112, and a bracket portion 116. Body portion 111 is provided with an elongated cylindrical recess 149 having a reduced upper portion 153 for receiving the inner thermocouple element which is welded or fused at casing 110 at the end of portion 153. Fuel is conducted to pilot burner 112 through a passageway 114 formed by co-operating depressions in the sheet metal members. To prevent leakage of fuel along the passageway 114 the sheet metal stampings are welded as indicated at 115 to seal the passage. Pilot burner 112 is welded at its inner periphery at 178 as indicated.

The embodiment of FIG. 5 has been found to be more suitable where the thickness of the sheet material does not erceed approximately .010 inch. As the thickness of the material increases, the amount of heat conducted along passage 114 away from the thermocouple increases.

For purposes of illustrating the invention, specific embodiments have been described which are to be construed as illustrative and not limiting the invention defined in the appended claims.

What is claimed is:

1. A thermocouple comprising,
a pair of thin, substantially flat, complementary sheet members of conductive material joined together at their peripheries, an element of conductive material dissimilar to the material of said members disposed between the members,
one end of said element being joined to the members to form a thermoelectric junction,
and means insulating the members from said element at the unconnected portions thereof,
said members being sufficiently thin and of a sufficient overall extent such that on heating the members will flex laterally outwardly with greater volumetric expansion than said element to compensate for the different expansion coefficients of said dissimilar materials and thereby reduce mechanical stresses between said members and said element.

2. A thermocouple comprising,
a casing of thin conductive sheet material, having a pair of generally flat, parallel walls,
and an element of conductive material dissimilar to the material of the casing disposed in said casing, one end of the element being joined to the inner sides of said pair of walls to form a thermoelectric junction,
said walls being sufficiently thin and of sufficient overall extent such that upon heating the walls will flex laterally outwardly with greater volumetric expansion than said element to compensate for the different expansion coefficients of said dissimilar materials and thereby reduce mechanical stresses between said walls and said element.

3. A thermocouple comprising,
a pair of thin and substantially flat, complementary sheet members of conductive material,
each of said members being formed with a pair of side edges and a bottom edge,
a depression formed in each of said members extending from the bottom edge and substantially centrally located relative to the side edges,
said members being joined together at their peripheral edges with said depressions in opposing relationship to form an enlarged cavity open at its end adjacent the bottom edges of the members,
and an element of conductive material dissimilar to the material of said members disposed in the cavity with one end of the element joined to the inner walls of the cavity to form a thermoelectric junction with said pair of members,
said members being sufficiently thin and of a sufficient overall extent such that on heating the members will flex laterally outwardly with greater volumetric expansion than said element to compensate for the different expansion coefficients of said dissimilar materials and thereby reduce mechanical stresses between said members and said element.

4. A thermocouple comprising,
a casing of thin conductive material having a pair of substantially flat and parallel walls joined together at their peripheral edges,
opposed depressions in each of said walls forming an enlarged cavity open at one end of the casing,
an element of conductive material dissimilar to the material of the casing disposed in the cavity with a portion of the element joined to the opposed inner walls of the cavity to form a thermoelectric junction with the casing,
and insulating material interposed between the inner walls of the cavity and all portions of the element removed from the thermoelectric junction,
said walls being sufficiently thin and of sufficient overall extent such that upon heating the walls will flex laterally outwardly with greater volumetric expansion than said element to compensate for the different expansion coeffiecients of said dissimilar materials and thereby reduce mechanical stresses between said walls and said element.

5. A thermocouple as defined in claim 4 including,
a second pair of opposed depressions in said members adjacent the thermoelectric junction forming a hollow pilot burner head,
a plurality of apertures in the pilot burner head,
and means for connecting the interior of said pilot burner head with a source of fluid fuel so that fuel burning at said apertures will heat the thermoelectric junction.

6. A thermocouple as defined in claim 4 including,
a coaxial lead assembly with the inner and outer leads of the assembly connected respectively to said element and said casing at positions remote from said thermoelectric junction.

7. A thermocouple comprising,
a pair of thin, complementary, substantially flat members of conductive material each having side edges and a bottom edge,
an elongate depression formed in each of said members extending from the bottom edge and located substantially centrally between the side edges and having a reduced portion at its end remote from the bottom edge,
said members being joined together in opposed relationship along their side edges with said depressions forming a cavity having an enlarged portion open at one end and a reduced portion remote from the open end,
a rod of conductive material dissimilar to the material of said members disposed in said cavity with its end positioned in the reduced portion and joined to said members to form a thermoelectric junction therewith,
and insulating material encasing said element in the enlarged portion of the cavity,
said members being sufficiently thin and of sufficient overall extent such that upon heating the members will flex laterally outwardly with greater volumetric expansion than said rod to compensate for the different expansion coefficients of said dissimilar materials and thereby reduce mechanical stresses between the members and the rod.

8. A thermocouple as defined in claim 7 including,
apertured depressions in each of said members adjacent the reduced end portion of the cavity,
said apertured depressions being in opposed relationship to each other when the members are joined together to form a pilot burner head positioned in flame impinging relationship to the thermoelectric junction,
and means for connecting the pilot burner head to a source of fuel.

9. A thermoelectric control device comprising,
a casing of conductive material having a pair of opposed substantially flat and parallel walls joined together along their peripheral edges,
an element of conductive material dissimilar to the material of the casing positioned in the casing and joined to said parallel walls to form a thermoelectric junction with the casing,
a pilot burner formed integral in the casing adjacent the thermoelectric junction in flame impinging relation therewith,
and means for connecting the pilot burner to a source of fluid fuel.

10. A thermoelectric control device as defined in claim 9 in which said pilot burner comprises a hollow, substantially sperical chamber having a plurality of apertures in the wall thereof.

11. A thermoelectric control device comprising,
a casing of conductive material having a body portion, a pilot burner portion, and a bracket portion,
said body portion having a pair of opposed substantially flat and parallel walls, opposed depressions in said walls forming an elongated cavity open at one end,
an element of conductive material received in the cavity having a portion joined to the inner wall of the cavity to form a thermoelectric junction with the casing,
opposed depressions in said pilot burner portion forming a hollow pilot burner head adjacent the thermoelectric junction,
at least one aperture in the pilot burner head,
means for connecting the interior of the pilot burner head with a source of fuel,
and means on said bracket portion for mounting the casing on a support,
said walls being sufficiently thin and of sufficient overall extent such that upon heating the walls will flex laterally outwardly with greater volumetric expansion than said element to compensate for any differences between the expansion rates of said element and said walls to thereby reduce mechanical stresses between said walls and said element.

12. A thermoelectric control device as defined in claim 11 in which the connecting means includes,
means defining an opening in the periphery of the pilot burner head,
a tubular conduit mounted on the bracket portion,
the end of said tubular conduit being loosely received in said opening for communication with the interior of the pilot burner head.

13. A thermoelectric control device as defined in claim 12 including,
a substantially cylindrical recess formed on the bracket portion for receiving the tubular conduit,
a slot in the wall of said recess,
a groove on said tubular conduit adjacent said slot,
and a slotted retaining member received in the slot and cooperating with the groove to retain the tubular conduit on the casing.

14. A thermoelectric control device as defined in claim 11 in which the connecting means comprises,
a second pair of opposed depressions in the walls of the body portion forming a conduit for fuel,
and one end of said conduit communicating with the interior of the pilot burner head for conducting fluid fuel thereto.

15. A thermocouple comprising,
an outer thermocouple element and an inner thermocouple element,
said outer element comprising a sheath of thin conductive material having a pair of opposed substantially flat and parallel walls,
said inner thermocouple element being received in the sheath and joined at one end to the opposed inner sides of said parallel walls to form a thermoelectric junction,
said walls being sufficiently thin and of sufficient overall extent such that upon heating the walls will flex laterally outwardly with greater volumetric expansion than said inner thermocouple element to compensate for any differences between the rates of expansion of said walls and said inner thermocouple element to thereby reduce mechanical stresses between the inner and outer thermocouple elements.

References Cited by the Examiner

UNITED STATES PATENTS

| | | | |
|---|---|---|---|
| 2,339,809 | 1/1944 | Ray | 136—4.13 |
| 2,833,843 | 5/1958 | Jackson et al. | 136—4.13 |

WINSTON A. DOUGLAS, *Primary Examiner.*

JOHN H. MACK, J. BARNEY, *Examiners.*

A. M. BEKELMAN, *Assistant Examiner.*